United States Patent [19]
Goyard

[11] 4,101,890
[45] Jul. 18, 1978

[54] RADAR RECONNAISSANCE SYSTEM FOR TRACK VEHICLE RECOGNITION

[75] Inventor: Pierre Jean-Marie Goyard, Fontenay le Fleury, France

[73] Assignee: International Standard Electric Corporation, New York, N.Y.

[21] Appl. No.: 766,935

[22] Filed: Feb. 9, 1977

[30] Foreign Application Priority Data

Mar. 10, 1976 [FR] France .................. 76 03563

[51] Int. Cl.² .......... G01S 9/44; G01S 9/42; G01S 9/02
[52] U.S. Cl. .................. 343/8; 343/5 PD; 343/5 SA; 343/7.7
[58] Field of Search ........... 343/5 PD, 5 SA, 7.7, 343/8

[56] References Cited
U.S. PATENT DOCUMENTS 3,983,558   9/1976   Rittenbach ................ 343/7.7

*Primary Examiner*—S. C. Buczinski
*Attorney, Agent, or Firm*—William T. O'Neil

[57] ABSTRACT

A radar reconnaissance system for recognition of echo signals from track type vehicles such as tanks. Circuits are included for identifying a Doppler spectrum shift on either side of the spectral line 2FD (harmonic of the main moving target Doppler frequency) due to echo signals from a track of the vehicle, the tracks inherently having point-by-point velocities up to double the vehicle velocity.

5 Claims, 3 Drawing Figures

RADAR RECONNAISSANCE SYSTEM FOR TRACK VEHICLE RECOGNITION

BACKGROUND OF THE INVENTION

1. Field of the Invention

The invention relates generally to pulsed radar systems and, more specifically, to tactical military zone surveillance by coherent Doppler radar systems for identifying particular types of vehicles — most particularly, track-type vehicles such as tanks.

2. Description of the Prior Art

Automatic reconnaissance of track-type vehicles, such as tanks and the like is of special importance for surveillance of operational military zones. Even if an operator is able to recognize, by aural analysis of the signals received by a radar, certain types of targets which present a particular characteristic echo signal spectrum, this recognition critically depends upon the ability and experience of the operator and also requires his constant attention. In addition, when a radar is used to monitor a zone, the analysis time of a radar resolution cell of a typical coherent Doppler system is very short, which gives rise to a source of errors. From this standpoint, the great advantage of an automatic reconnaissance device for monitoring and recognizing the presence of vehicles such as tracked vehicles, operating in combination with a radar and unassisted by the operator, can be readily seen. Basic coherent Doppler systems upon which the present invention builds, are known to those skilled in this art and are widely described in the patent and other technical literature.

SUMMARY

It may be said to have been the general object of this invention to provide a device using signals supplied by a pulse-type Doppler radar receiver to automatically determine if the received echoes contain signals corresponding to tracked vehicles.

According to the general form of the invention, the automatic tracked vehicle reconnaissance device provided includes:

frequency doubling means circuit receiving the video signal supplied by a radar receiver;

amplitude limiting means for reducing amplitude fluctuations of the output signal of the aforementioned frequency doubler means;

a multiplier for calculating the product of the output signal of the amplitude limiter and the video signal supplied by the radar receiver;

means for band-pass filtering of the output signal of the multiplier circuit;

a first amplitude detector receiving the video signal of the radar receiver;

a second amplitude detector circuit receiving the output signal of the band-pass filter;

a quotient computer calculating the quotient of the output signal of the second amplitude detector circuit and the output signal of the first amplitude detector circuit;

and a comparator circuit comparing the output signal of the quotient computer with a fixed threshold value and furnishing an output signal indicating whether or not the said threshold has been exceeded.

Additional objects, characteristics and advantages of this invention will be evident as the hereinafter description of a preferred embodiment is fully understood.

DESCRIPTION OF THE PREFERRED EMBODIMENT

Figure 1:
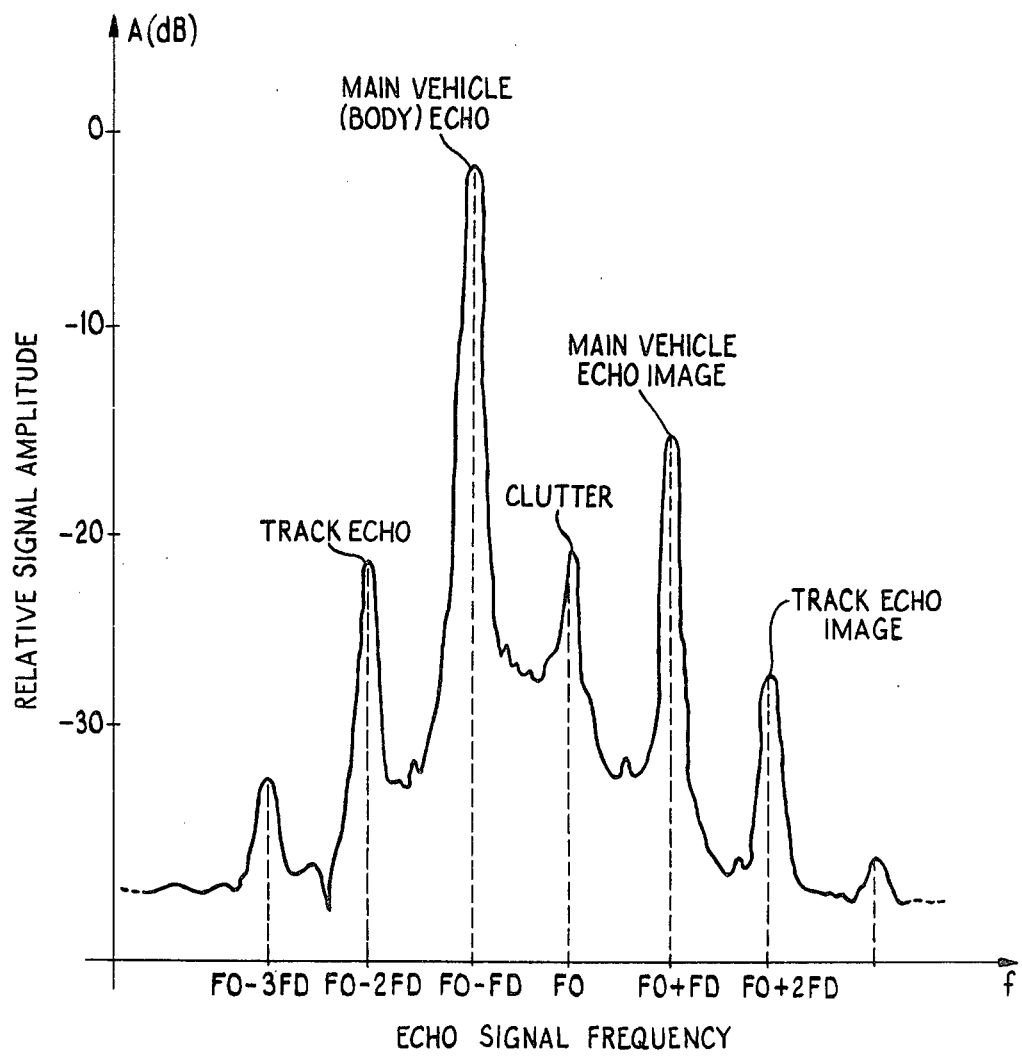
FIG. 1 shows a typical spectrum received from a track-type vehicle.

The spectrum shown in FIG. 1 permits the basic principles of the invention to be understood. The main peak of the spectrum is due to the main vehicle (body) echo, its frequency being shifted with respect to the repetition frequency FO of the transmitted signal by a quantity FD. This frequency shift is caused by the radial component of the vehicle's own speed (FD representing the Doppler frequency). At frequency FO, we find the ground (clutter) echo due to slow moving objects and those whose average speed of motion is zero. Another peak shown in FIG. 1 is shifted in frequency from the frequency FO by an amount equal to twice the Doppler frequency FD. This peak represents the echo from the vehicle's caterpillar tracks. In fact, if the vehicle is moving at a speed V with respect to the ground, it will be realized that the upper part of the tracks is then moving at a speed of 2V.

This invention is designed to make use of this characteristic to automatically recognize the presence of tracked vehicles in a zone scanned by radar. The principle employed for the recognition of track vehicles is based on the simultaneous observation of the two characteristic frequencies FD and 2FD. However, as shown in FIG. 1, the Doppler component corresponding to the movement of the (caterpillar) tracks is at a much lower level (due to the much smaller area) than the echo from the vehicle body and furthermore non-linearities of the radar receivers can cause the 2nd harmonic of the Doppler signal received from a wheeled vehicle to appear. The result can therefore be false identification if the criterion for recognizing tracked vehicles is based solely on the simultaneous presence of the two characteristic frequencies FD and 2FD. A closer analysis of the signal received from a tracked vehicle shows that the Doppler frequency of the signal reflected by a track is slightly shifted and thus no longer exactly twice the Doppler frequency FD of the body echo. This peculiarity is due to the fact that there is always a slight slippage between track and ground, especially when the tracked vehicle is travelling over rough terrain.

Figure 2:
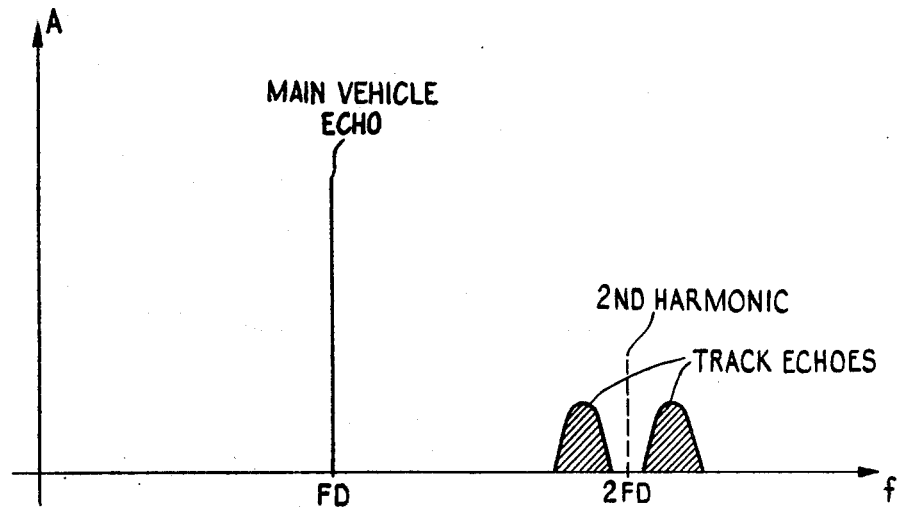
FIG. 2 is a frequency/amplitude graph showing the respective positions and amplitudes of the main vehicle echo, caterpillar track echoes and the second harmonic of the main vehicle echo.

The diagram in FIG. 2 shows how this latter characteristic is used to advantage by the invention to produce an automatic track vehicle reconnaissance device operating even in the presence of high harmonic distortion of the signal received from the body of the vehicle (main vehicle echo). The characteristic body echo line at the Doppler frequency FD is shown in FIG. 2 along with the 2nd harmonic of the body echo at the frequency 2FD. On either side of the spectral line at 2FD, the spectrum of the signal reflected by the tracks is seen to cause a slight shift to appear with respect to the frequency 2FD. It is this phenomenon which is used in the reconnaissance device described below in connection with FIG. 3.

Figure 3:
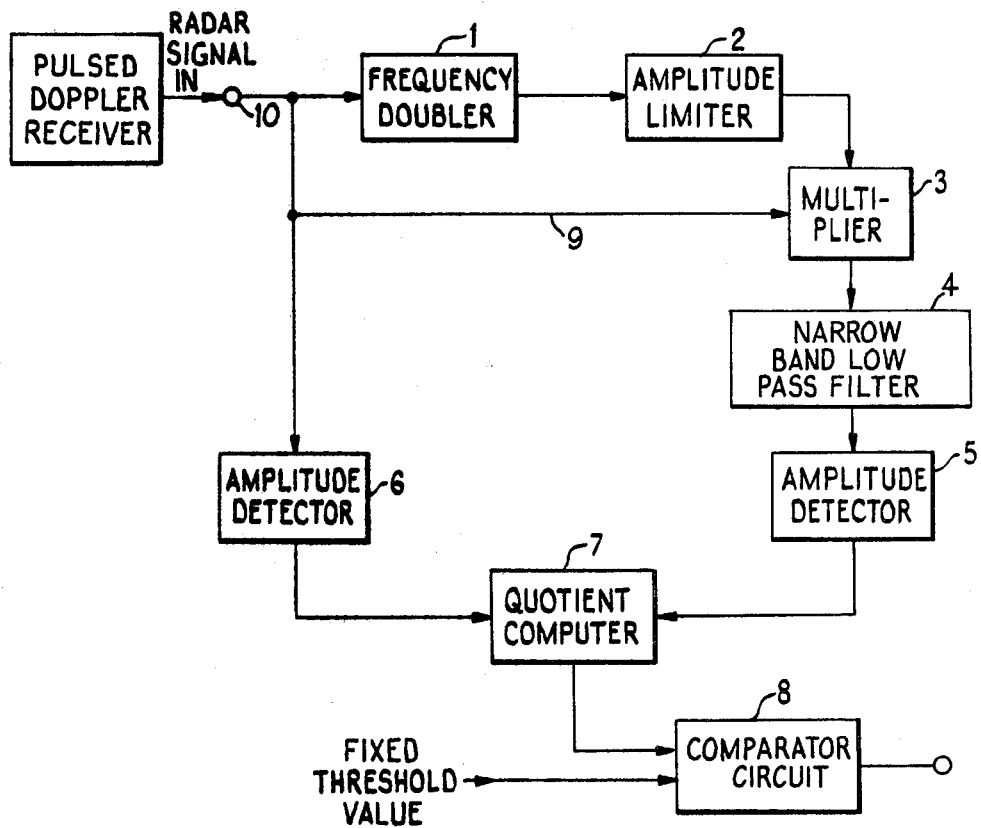
FIG. 3 is a schematic block diagram of the automatic tracked vehicle reconnaissance device in accordance with the principles of the invention.

Referring now to FIG. 3, the radar signal, for example, supplied by a typical range selector of a Doppler MTI radar system receiver. In practice, reconnaissance of track vehicles should be carried out for each resolution cell, and a radar receiver adapted for this purpose will contain as many duplicate devices, such as the one in FIG. 3, as there are range selectors (i.e., range "bins") in the system. The device in FIG. 3 includes a frequency doubler 1 supplying, from the radar signal at 10, a signal doubled in frequency. This doubled-frequency signal is then applied to an amplitude limiter 2 in which it is standardized at a value not exceeding a predetermined maximum. The output signal from circuit 2 is then applied to a multiplier 3 which also receives the incident radar signal on line 9.

A narrow-band (a few Hz) filter circuit 4 selects, from the output signal of circuit 3, only the signal component due to the echo of the vehicle tracks. In other words, the filter 4 allows only signals having a frequency of 2 to 5 Hz (for example) to pass. This frequency range represents the transposed Doppler frequency ranges on both sides of the spectral line at 2FD of FIG. 2.

The presence of an output signal from the filter circuit 4 therefore indicates the presence of track echoes. The amplitude detectors 5 and 6 supply a signal proportional to the amplitude of the incident radar signal (circuit 6) and a signal proportional to the amplitude of the filter 4 output signal (circuit 5). Circuit 7 calculates the quotient of the output signal of circuit 5 over the output signal of circuit 6. The quotient computer 7 normalizes the signal due to the track echo. This operation is necessary when the criterion of recognition of tracked vehicles is based on whether or not a signal at the frequency $2FD \pm \epsilon$ exists which is a given ratio with the received signal of frequency FD. To do this, the output signal from the quotient computer 7 is compared to a fixed threshold in the comparator circuit 8. The output of comparator 8 therefore indicates the presence or absence of a track-type vehicle in the resolution cell examined. The value of the threshold (which may be empirically determined and set into 8) applied to the comparator circuit 8 corresponds to the average value of the ratio of the amplitudes of the signals reflected by the body of the vehicle to that from the (caterpillar) tracks, the average value of this ratio being approximately 30dB.

Although this invention has been described in connection with a particular application, it is clearly not limited to the said application and is capable of other variants or modifications. Accordingly, it is not intended that the drawings or this description should be regarded as limiting the scope of the invention, these being intended to be typical and illustrative only.

What is claimed is:

1. In a pulsed Doppler radar system providing at least one received signal corresponding to a discrete range bin, the combination comprising:

first means responsive to said received signal to provide a second signal the components of which are of doubled frequency as compared to said received signal;

multiplier means responsive to said received signal and to said second signal to provide a third signal which is the product of said received and second signals;

filter means responsive to said third signal to produce a fourth signal which contains substantially only those spectral components corresponding to the tracks of a track vehicle;

first and second amplitude detectors responsive to said received and said fourth signal, respectively, to provide demodulated received and fourth signals;

second means responsive to the outputs of said amplitude detectors to produce a fifth signal which is the quotient of said demodulated fourth signal divided by said demodulated received signal;

and third means for comparing said fifth signal with a fixed threshold representative of the average ratio of the amplitudes of the signals reflected by the vehicle body to those refelected from a track of said vehicle, said third means providing an output indicative of the presence of said track vehicle at the range corresponding to said received signal range bin.

2. Apparatus according to claim 1 in which said filter means comprises a narrow-band low frequency filter adapted for passing substantially only frequencies of $2FD \pm 7 E$, where FD is the Doppler component corresponding body echoes of said vehicle and E is the variation of frequency due to track slip.

3. Apparatus according to claim 2 in which said filter passes signals not exceeding 5 Hz approximately.

4. Apparatus according to claim 2 further including an amplitude limiter responsive to the output of said first means to limit the amplitude of said second signal to a predetermined maximum value.

5. Apparatus according to claim 1 further including an amplitude limiter responsive to the output of said first means to limit the amplitude of said second signal to a predetermined maximum value.

* * * * *